United States Patent
Wang et al.

(10) Patent No.: US 10,534,226 B2
(45) Date of Patent: Jan. 14, 2020

(54) CURVED DISPLAY DEVICE, METHOD FOR MANUFACTURING CURVED DISPLAY DEVICE AND ELECTRONIC DEVICE

(71) Applicant: Boe Technology Group Co., Ltd., Beijing (CN)

(72) Inventors: Xinxing Wang, Beijing (CN); Weili Zhao, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 248 days.

(21) Appl. No.: 15/119,355

(22) PCT Filed: Jan. 15, 2016

(86) PCT No.: PCT/CN2016/071046
§ 371 (c)(1),
(2) Date: Aug. 16, 2016

(87) PCT Pub. No.: WO2017/000544
PCT Pub. Date: Jan. 5, 2017

(65) Prior Publication Data
US 2017/0192267 A1    Jul. 6, 2017

(30) Foreign Application Priority Data
Jul. 2, 2015 (CN) .......................... 2015 1 0380524

(51) Int. Cl.
*G02F 1/1339* (2006.01)
*G02F 1/1335* (2006.01)
*G02F 1/1368* (2006.01)

(52) U.S. Cl.
CPC .......... *G02F 1/1339* (2013.01); *G02F 1/1368* (2013.01); *G02F 1/133528* (2013.01); *G02F 2201/56* (2013.01)

(58) Field of Classification Search
CPC combination set(s) only.
See application file for complete search history.

(56) References Cited

U.S. PATENT DOCUMENTS

2007/0095468 A1    5/2007  Kim et al.
2008/0303975 A1*  12/2008  Mizuno ................. G02B 5/045
                                                                349/62

(Continued)

FOREIGN PATENT DOCUMENTS

CN    102707474 A    10/2012
CN    104730773      6/2015

(Continued)

OTHER PUBLICATIONS

First Office Action for Chinese Patent Application No. 201510380524.2 dated Jun. 28, 2017.

(Continued)

*Primary Examiner* — Joseph L Williams
*Assistant Examiner* — Jacob R Stern
(74) *Attorney, Agent, or Firm* — Calfee, Halter & Griswold LLP

(57) ABSTRACT

The present invention provides a curved display device, a method for manufacturing a curved display device and an electronic device. The curved display device may comprise a first curved light-transmitting substrate, a second curved light-transmitting substrate arranged opposite to the first curved light-transmitting substrate and a sealant having a particular width distribution which is located between the first curved light-transmitting substrate and the second curved light-transmitting substrate and coated along edges of the first curved light-transmitting substrate and the second curved light-transmitting substrate. The sealant having particular width distribution enables the first curved light-transmitting substrate to adhere to the second curved light-transmitting substrate, and reduces the stresses in the first (Continued)

curved light-transmitting substrate and the second curved light-transmitting substrate, while changing the stress distributions of the first curved light-transmitting substrate and the second curved light-transmitting substrate.

17 Claims, 5 Drawing Sheets

(56) References Cited

U.S. PATENT DOCUMENTS

| | | | |
|---|---|---|---|
| 2009/0201443 A1 | 8/2009 | Sasaki et al. | |
| 2010/0231841 A1 | 9/2010 | Nagata et al. | |
| 2014/0063434 A1 | 3/2014 | Zhao et al. | |
| 2014/0092356 A1* | 4/2014 | Ahn | G02F 1/1339 349/153 |

FOREIGN PATENT DOCUMENTS

| | | |
|---|---|---|
| CN | 104749824 | 7/2015 |
| CN | 104777678 | 7/2015 |
| CN | 104914612 | 9/2015 |
| CN | 105185239 | 12/2015 |
| JP | 2002341792 A | 11/2002 |
| JP | 2007178706 | 7/2007 |
| JP | 2008076928 A | 4/2008 |
| JP | 2009042565 A | 2/2009 |
| JP | 2010060585 A | 3/2010 |
| JP | 4784001 B2 | 9/2011 |
| JP | 5028799 B2 | 9/2012 |
| JP | 2012185457 | 9/2012 |
| JP | 2012185457 A | 9/2012 |

OTHER PUBLICATIONS

International Search Report and Written Opinion from PCT/CN16/071046 dated Apr. 14, 2016.

Search Report for European Patent Application No. 16747857.7 dated Nov. 22, 2018.

* cited by examiner (A)

(B)

(A)

(B)

CURVED DISPLAY DEVICE, METHOD FOR MANUFACTURING CURVED DISPLAY DEVICE AND ELECTRONIC DEVICE

RELATED APPLICATIONS

The present application is the U.S. national phase entry of PCT/CN2016/071046, with an international filling date of Jan. 15, 2016, which claims the benefit of Chinese Patent Application NO. 201510380524.2, filed on Jul. 2, 2015, the entire disclosure of which is incorporated herein by reference.

FIELD OF THE INVENTION

The present invention relates to the field of curved display, and specifically to a curved display device, a method for manufacturing a curved display device and an electronic device.

BACKGROUND

In the field of existing curved display devices, the upper glass substrate is bonded to the lower glass substrate by means of a sealant. Upon being curved, the upper glass substrate 12 (in the case of operating the curved display device, the upper glass substrate 12 is closer to the viewer) always bears a compressive stress, as shown in FIG. 1, and the lower glass substrate 16 (in the case of operating the curved display device, the lower glass substrate 16 is usually far from the viewer) always bears a tensile stress, as shown in FIG. 2. This is because the lower glass substrate 16 encloses the external side of the upper glass substrate 12, which limits recovery of the elasticity of the upper glass substrate 12 to its original state. As can be seen from the middle area 13, the upper-left corner area 14a and the upper-right corner area 14b as shown in FIG. 1, the stresses in the areas close to the middle area 13 of the upper glass substrate 12 substantially exhibit a horizontal state. It can be regarded that the compressive stresses they bear are at a level close to 0° or 180°. In other words, the optical axes in the middle area 13 of the upper glass substrate 12 are close to 0° or 180°. The stresses in the areas close to the edges such as corners, for example, the upper-left corner area 14a and the upper-right corner area 14b, substantially exhibit an inclined state, and the closer the areas are to the corners, the larger the inclined angles of the stresses become. It can be regarded that the compressive stresses they bear are at a level close to 30° or −30°, and for the areas closer to the corner areas of the upper glass substrate 12, i.e. four corner areas, the compressive stresses they bear are even at a level close to 45° or −45°. In other words, the optical axes in the upper-left corner area 14a and the upper-right corner area 14b of the upper glass substrate 12 are close to 30° or −30°, and in the areas closer to the corner areas of the upper glass substrate 12, the optical axes are at a level closer to 45° or −45°, which is usually considered in the art as the maximum light leaking angle.

Likewise, as can be seen from the middle area 17, the upper-left corner area 18a and the upper-right corner area 18b of the lower glass substrate 16 as shown in FIG. 2, the stresses in the areas close to the middle area 17 of the lower glass substrate 16 substantially exhibit a horizontal state. It can be regarded that the tensile stresses they bear or the optical axes in the middle area 17 are close to 0° or 180°. The tensile stresses in the areas close to the corners, for example, the upper-left corner area 18a and the upper-right corner area 18b, substantially exhibit an inclined state. It can be regarded that the tensile stresses they bear are at a level close to 30° or −30°, and in the areas closer to the corner areas of the lower glass substrate 16, i.e. four corner areas, the tensile stresses they bear are even at a level close to 45° or −45°. In other words, the optical axes in the upper-left corner area 18a and the upper-right corner area 18b are close to 30° or −30°, even close to 45° or −45°.

Furthermore, in the existing curved display devices, surfaces of the upper glass substrate 12 and the lower glass substrate 16 are usually further provided with polarizers whose polarization directions are orthogonal to each other, so as to prevent transmission of light in dark state. However, for the existing curved display devices, there is a lot of light leakage at four corners of each of the upper glass substrate 12 and lower glass substrate 16, and the function of blocking transmission of light in dark state cannot be well achieved. That is, there is considerable light leakage.

Therefore, for the existing curved display devices, there is an urgent demand for improving the above problems.

SUMMARY

In view of this, embodiments of the invention provide a curved display device, a method for manufacturing a curved display device and an electronic device, which can solve or at least alleviate at least part of the deficiencies existing in the prior art.

An embodiment of the invention provides a curved display device, which may comprise a first curved light-transmitting substrate, a second curved light-transmitting substrate arranged opposite to the first curved light-transmitting substrate, and a sealant located between the first curved light-transmitting substrate and the second curved light-transmitting substrate and arranged along edges of the first curved light-transmitting substrate and the second curved light-transmitting substrate, the sealant comprising a first sealant located at an edge of a non-curved side of the first curved light-transmitting substrate and an edge of a non-curved side of the second curved light-transmitting substrate, and a second sealant located at an edge of a curved side of the first curved light-transmitting surface and an edge of a curved side of the second curved light-transmitting surface, the first sealant and the second sealant enabling the first curved light-transmitting substrate to adhere to the second curved light-transmitting substrate, and reducing stresses in the first curved light-transmitting substrate and the second curved light-transmitting substrate, while changing stress distributions of the first curved light-transmitting substrate and the second curved light-transmitting substrate.

By virtue of the sealant of the embodiment of the invention, the stresses in the first curved light-transmitting substrate and the second curved light-transmitting substrate are reduced, and the stress distributions of the first curved light-transmitting substrate and the second curved light-transmitting substrate are changed. In this way, it helps to reduce the amount of light leakage in the finished curved display device in dark state.

In some embodiments, the first sealant and the second sealant may have the same material.

In some embodiments, when the first sealant and the second sealant have the same width, the amount of light transmitting the first curved light-transmitting substrate and the second curved light-transmitting substrate increases as the widths of the first sealant and the second sealant increase.

In some embodiments, when the width W2 of the second sealant is a fixed value, the amount of light transmitting the first curved light-transmitting substrate and the second curved light-transmitting substrate decreases as the width W1 of the first sealant increases.

In some embodiments, when the width W1 of the first sealant is a fixed value, the amount of light transmitting the first curved light-transmitting substrate and the second curved light-transmitting substrate increases as the width W2 of the second sealant increases.

In some embodiments, the width W1 of the first sealant is larger than the width W2 of the second sealant.

In another embodiment of the invention, the ratio of the width W1 of the first sealant to the width W2 of the second sealant is $1 < W1/W2 \leq 6$.

In some embodiments, a space enclosed by the first curved light-transmitting substrate, the second curved light-transmitting substrate and the sealant comprises a liquid crystal layer.

In some embodiments, the first curved light-transmitting substrate is a color filter light-transmitting substrate or transparent conductive film light-transmitting substrate, and the second curved light-transmitting substrate is a thin film transistor light-transmitting substrate.

In some embodiments, the curved display device may further comprise a first polarizer located on a surface of the first curved light-transmitting substrate opposite to the second curved light-transmitting substrate, a second polarizer located on a surface of the second curved light-transmitting substrate away from the first curved light-transmitting substrate, a polarization direction of the first polarizer is orthogonal to that of the second polarizer.

Another embodiment of the invention provides a method for manufacturing a curved display device, which may comprise a step of forming, between a first curved light-transmitting substrate and a second curved light-transmitting substrate arranged opposite to the first curved light-transmitting substrate, a sealant along edges of the first curved light-transmitting substrate and the second curved light-transmitting substrate, the sealant comprising a first sealant located at an edge of a non-curved side of the first curved light-transmitting substrate and an edge of a non-curved side of the second curved light-transmitting substrate, and a second sealant located at an edge of a curved side of the first curved light-transmitting surface and an edge of a curved side of the second curved light-transmitting surface, the sealant enabling the first curved light-transmitting substrate to adhere to the second curved light-transmitting substrate, and reducing stresses in the first curved light-transmitting substrate and the second curved light-transmitting substrate, while changing stress distributions of the first curved light-transmitting substrate and the second curved light-transmitting substrate.

By virtue of the sealant of this embodiment of the invention, the stresses in the first curved light-transmitting substrate and the second curved light-transmitting substrate are reduced, and the stress distributions of the first curved light-transmitting substrate and the second curved light-transmitting substrate are changed. In this way, it helps to reduce the amount of light leakage in the finished curved display device in dark state.

In some embodiments, the coated sealant may comprise the first sealant, the width W1 of which is larger than the width W2 of the second sealant.

In some embodiments, the step of forming the sealant may be achieved by means of coating, the method comprises increasing a pressure on a sealant applicator nozzle at the time of coating edges of non-curved sides of the first curved light-transmitting substrate and the second curved light-transmitting substrate, and decreasing the pressure on the sealant applicator nozzle at the time of coating edges of curved sides of the first curved light-transmitting substrate and the second curved light-transmitting substrate.

In some embodiments, the method comprises: performing injection more times by a sealant applicator nozzle at positions parallel to the edges of non-curved sides of the first curved light-transmitting substrate and the second curved light-transmitting substrate than at positions parallel to the edges of curved sides of the first curved light-transmitting substrate and the second curved light-transmitting substrate.

In some embodiments, the ratio of the width W1 of the first sealant to the width W2 of the second sealant is $1 < W1/W2 \leq 6$.

In some embodiments, the method comprises the step of arranging a liquid crystal layer between the first curved light-transmitting substrate and the second curved light-transmitting substrate, prior to forming a sealant along edges of the first curved light-transmitting substrate and the second curved light-transmitting substrate.

In some embodiments, the first curved light-transmitting substrate is a color filter light-transmitting substrate or transparent conductive film light-transmitting substrate, and the second curved light-transmitting substrate is a thin film transistor light-transmitting substrate.

A further embodiment of the invention provides an electronic device, which may comprise the curved display device as described in any of the above embodiments or the curved display device manufactured using the above method for manufacturing a curved display device.

DETAILED DESCRIPTION OF THE INVENTION

Embodiments of the invention will be described below in detail with reference to the drawings.

For the following description and accompanying figures, the following reference signs will be used:

2—first curved light-transmitting substrate;
4—second curved light-transmitting substrate;
6—non-curved sides of sealant; 8—curved sides of sealant;
10—curved display device; 12—upper glass substrate;
13—middle area of upper glass substrate;
14a—upper-left corner area of upper glass substrate;
14b—upper-right corner region of upper glass substrate;
16—lower glass substrate; 17—middle area of lower glass substrate; 18a—upper-left corner area of lower glass substrate;
18b—upper-right corner area of lower glass substrate.

Figure 1:
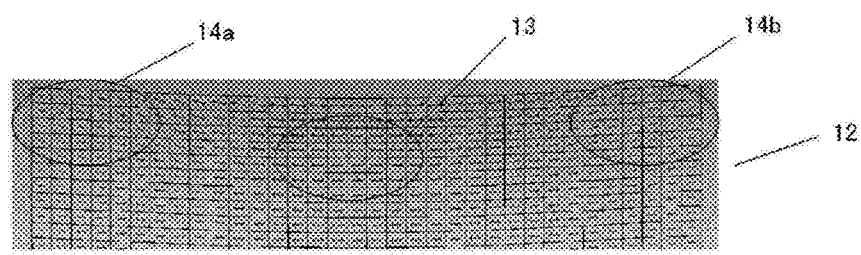
FIG. 1 illustrates a distribution of compressive stresses existing in an upper glass substrate in the conventional curved display device.
Figure 2:
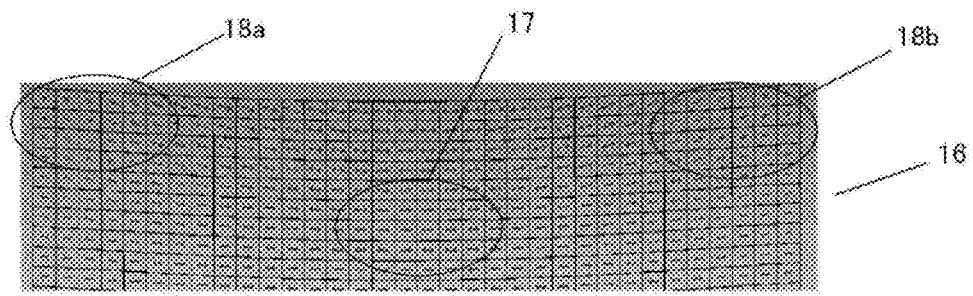
FIG. 2 illustrates a distribution of tensile stresses existing in a lower glass substrate in the conventional curved display device.

As mentioned in the background, for the existing curved display device shown in FIG. 1, there is a distribution of compressive stresses in an upper glass substrate 12, and there is a distribution of tensile stresses in a lower glass substrate 16. In order to overcome serious light leakage that occurs in the corner areas of the existing curved display device due to the distribution of stresses, for example, there is serious light leakage in the upper-left corner area 14a and the upper-right corner area 14b of the upper glass substrate 12, and the upper-left corner area 18a and the upper-right corner area 18b of the lower glass substrate 16, embodiments of the invention are particularly proposed.

Figure 3:
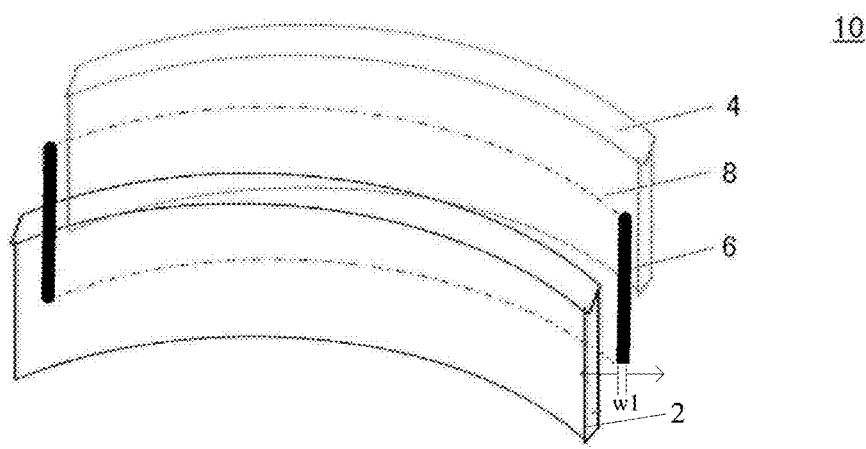
FIG. 3 illustrates a curved display device according to an embodiment of the invention.

FIG. 3 illustrates a curved display device 10 according to an embodiment of the invention. The curved display device 10 may comprise an upper curved light-transmitting substrate 2, a lower curved light-transmitting substrate 4 arranged opposite to the upper curved light-transmitting substrate 2, a sealant located between the upper curved light-transmitting substrate 2 and the lower curved light-transmitting substrate 4 and arranged along edges of the upper curved light-transmitting substrate 2 and the lower curved light-transmitting substrate 4. FIG. 3 shows a non-curved side 6 of the sealant and a curved side 8 of the sealant. In the curved display device, the short sides of the curved display device can usually be considered as non-curved sides, and the long sides of the curved display device can be considered as curved sides. Likewise, the short sides of the upper curved light-transmitting substrate 2, the lower curved light-transmitting substrate 4 and the sealant are non-curved sides, and the long sides of the upper curved light-transmitting substrate 2, the lower curved light-transmitting substrate 4 and the sealant are curved sides. The reason for making such differentiation is that in the course of manufacturing the curved display device and in the finished curved display device, the short sides may substantially be considered to be non-curved, while the long sides have a certain curvature. The sealant enables the upper curved light-transmitting substrate to adhere to the lower curved light-transmitting substrate, and reduces the stresses in the upper curved light-transmitting substrate and the lower curved light-transmitting substrate, while changing the stress distributions of the upper curved light-transmitting substrate and the lower curved light-transmitting substrate and improving light leakage in dark state. As regards how to reduce the stresses of the upper curved light-transmitting substrate 2 and the lower curved light-transmitting substrate 4 while changing the stress distributions of the upper curved light-transmitting substrate 2 and the lower curved light-transmitting substrate 4, it will be further described below in detail.

In the specification and claims of the application, for the convenience of description, the sealant arranged along edges of the non-curved sides of the upper curved light-transmitting substrate 2 and the lower curved light-transmitting substrate 4 is usually called a first sealant, while the sealant arranged along edges of the curved sides of the upper curved light-transmitting substrate 2 and the lower curved light-transmitting substrate 4 is called a second sealant. The upper curved light-transmitting substrate 2 may also be referred to as a first curved light-transmitting substrate, and the lower curved light-transmitting substrate 4 may also be referred to as a second curved light-transmitting substrate. In the embodiments of the invention, the first sealant and the second sealant may be in the shape of a strip. Accordingly, the width of the sealant arranged along edges of the non-curved sides of the upper curved light-transmitting substrate 2 and the lower curved light-transmitting substrate 4 is called the width of the first sealant, while the width of the sealant arranged along edges of the curved sides of the upper curved light-transmitting substrate 2 and the lower curved light-transmitting substrate 4 is called the width of the second sealant.

It is to be noted that the "first sealant" and the "second sealant" herein are sealants of the same type. They are named differently just because the positions thereof are different, which does not mean that the "first sealant" and the "second sealant" are sealants of two different types or categories. In some embodiment, the first sealant and the second sealant have the same material.

Figure 4:
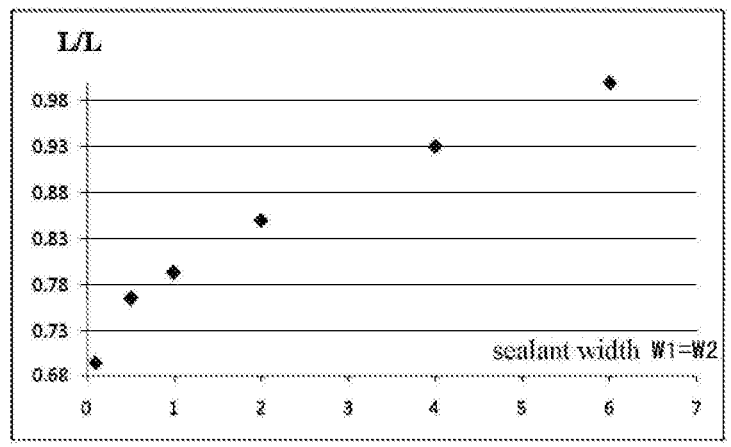
FIG. 4 illustrates a trend chart of light leakage when the widths of the first sealant and the second sealant are the same and vary simultaneously in an embodiment of the invention.

FIG. 4 illustrates a trend chart of light leakage according to an embodiment of the invention in which the width W2 of the second sealant and the width W1 of the first sealant are the same (i.e. W1=W2) and vary simultaneously. From the simulation trend chart as shown in FIG. 4, it can be seen that as the width W2 of the second sealant and the width W1 of the first sealant gradually become larger, the ratio L/L of the amount of light leakage as shown in the ordinate gradually increases. The ratio L/L of the amount of light leakage which appears in respective drawings of the application is a ratio value and does not have any unit. As the width W2 of the second sealant and the width W1 of the first sealant gradually become smaller, the ratio L/L of the amount of light leakage as shown in the ordinate gradually decreases. From the trend chart of light leakage as shown in FIG. 4, it can be seen that when the abscissa W1=W2 is 6, the ratio L/L of the amount of light leakage as shown in the ordinate is about 0.99 and even approximates to 1; when the abscissa W1=W2 is 4, the ratio L/L of the amount of light leakage as shown in the ordinate is about 0.93; when the abscissa W1=W2 is 1, the ratio L/L of the amount of light leakage as shown in the ordinate is about 0.80. Inspired by the simulation result of FIG. 4, it is possible to make the width of the sealant located between the upper curved light-transmitting substrate 2 and the lower curved light-transmitting substrate 4 and arranged along edges of the upper curved light-transmitting substrate 2 and the lower curved light-transmitting substrate 4 as small as possible, that is, the width of the first sealant and the width of the second sealant are reduced as much as possible. In the case that the sealant has a relatively small width, the stress distributions of the upper curved light-transmitting substrate 2 and the lower curved light-transmitting substrate 4 would be improved, thereby reducing the amount of light leakage in dark state.

Figure 5:
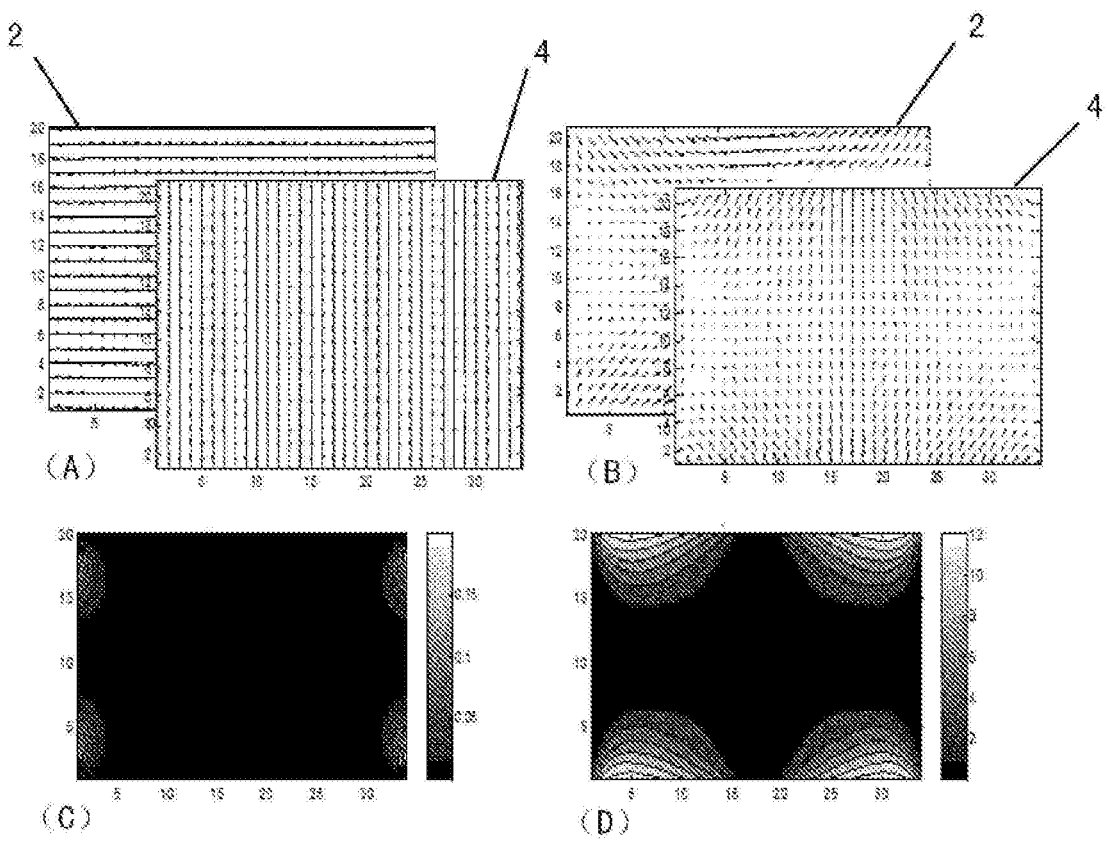
FIG. 5A illustrates a distribution of optical axes of the first curved light-transmitting substrate and the second curved light-transmitting substrate in the case that edges of the curved sides are not coated with a sealant while only edges of the non-curved sides are coated with a sealant.
FIG. 5B illustrates a distribution of optical axes of the first curved light-transmitting substrate and the second curved light-transmitting substrate in the case that edges of the non-curved sides are not coated with a sealant while only edges of the curved sides are coated with a sealant.
FIG. 5C illustrates a simulation view of light leakage of the curved display device in the case that edges of the curved sides are not coated with a sealant while only edges of the non-curved sides are coated with a sealant.
FIG. 5D illustrates a simulation view of light leakage of the curved display device in the case that edges of the non-curved sides are not coated with a sealant while only edges of the curved sides are coated with a sealant.

In order to study which one of the sealant arranged along the non-curved side 6 and the sealant arranged along the curved side 8 has greater impact on reduction of stresses, improvement of stress distributions and improvement of the amount of light leakage in dark state, the inventors have conducted simulation experiments as follows. FIG. 5A illustrates a distribution of optical axes of the upper curved light-transmitting substrate 2 and the lower curved light-transmitting substrate 4 in the case that edges of the curved sides are not coated with a sealant while only edges of the non-curved sides are coated with a sealant. It can be seen that the optical axis of the upper curved light-transmitting substrate 2 is essentially perpendicular to that of the lower curved light-transmitting substrate 4. In this manner, the light leakage in dark state may be avoided. FIG. 5C illustrates a simulation view of light leakage of the curved display device in the case that edges of the curved sides are not coated with a sealant while only edges of non-curved sides are coated with a sealant. The simulation result of FIG. 5C can further indicate that there is a small amount of light leakage in the case that edges of the curved sides are not coated with a sealant while only edges of non-curved sides are coated with a sealant. FIG. 5C contains a few white areas. The white areas represent light leakage areas in dark state, and the black areas represent areas where the light is blocked in dark state. It is usually regarded that the fewer the white areas are or the more the black areas are, the smaller the amount of light leakage in dark state is, and the better the effect of blocking transmission of light is.

FIG. 5B illustrates a distribution of optical axes of the upper curved light-transmitting substrate 2 and the lower curved light-transmitting substrate 4 in the case that edges of the non-curved sides are not coated with a sealant while only edges of the curved sides are coated with a sealant. It can be seen that the optical axis of the upper curved light-transmitting substrate 2 is slightly perpendicular to that of the lower curved light-transmitting substrate 4. In this way, there would be light leakage to some extent in dark state. The simulation result of FIG. 5D can further indicate that there is a relatively large amount of light leakage in the case that edges of the non-curved sides are not coated with a sealant while only edges of the curved sides are coated with a sealant. As compared to FIG. 5C, FIG. 5D contains more white areas and fewer black areas. This implies that there is a relatively small amount of light leakage in the case of FIG. 5C, and there is a relatively large amount of light leakage in the case of FIG. 5D.

FIGS. 5A, 5C and FIGS. 5B, 5D describe the situations of light leakage in two extreme cases, i.e. in the case that edges of the curved sides are not coated with a sealant while only edges of the non-curved sides are coated with a sealant (as shown in FIGS. 5A, 5C) and in the case that edges of the non-curved sides are not coated with a sealant while only edges of the curved sides are coated with a sealant.

Figure 6:
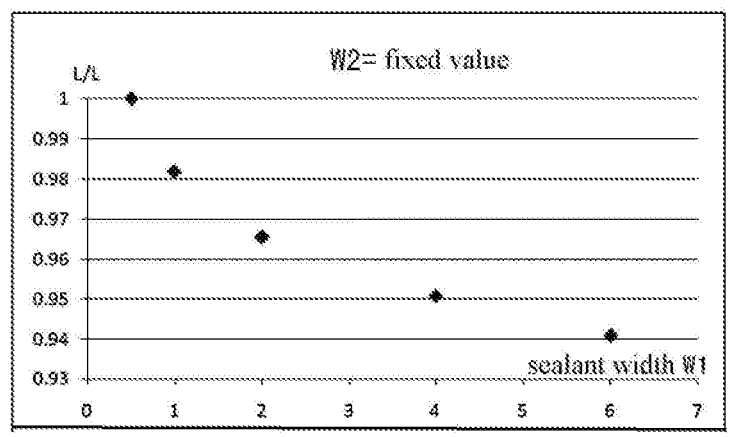
FIG. 6A illustrates a trend chart of light leakage of the curved display device varying with the variation in the width of the first sealant in the case that the width of the second sealant is fixed.
FIG. 6B illustrates a trend chart of light leakage of the curved display device varying with the variation in the width of the second sealant in the case that the width of the first sealant is fixed.
Figure 6:
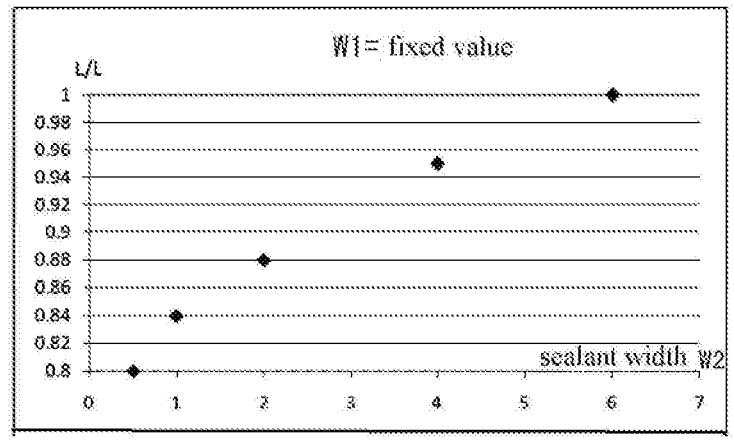

FIGS. 6A and 6B describe, under normal circumstances, which one of the sealant (first sealant) coated at edges of the non-curved sides and the sealant (second sealant) coated at edges of the curved sides has greater impact on the amount of light leakage. For example, FIG. 6A illustrates a trend chart of light leakage of the curved display device varying with the variation in the width W1 of the first sealant in the case that the width W2 of the second sealant is fixed, i.e. W2 is a fixed value. FIG. 6B illustrates a trend chart of light leakage of the curved display device varying with the variation in the width W2 of the second sealant in the case that the width W1 of the first sealant is fixed, i.e. W1 is a fixed value. From the simulation result shown in FIG. 6A, it can be learned that in the case that the width W2 of the second sealant is fixed, as the width W1 of the first sealant gradually increases, the amount of light leakage in dark state, i.e. the amount of light transmitting the upper curved light-transmitting substrate 2 and the lower curved light-transmitting substrate 4, gradually decreases. This implies that in the case of fixing the width W2 of the second sealant, increasing the width W1 of the first sealant helps to reduce the amount of light leakage. From the simulation result shown in FIG. 6B, it can be seen that in the case of fixing the width W1 of the first sealant, as the width W2 of the second sealant gradually increases, the amount of light leakage in dark state gradually increases. This implies that in the case of fixing the width W1 of the first sealant, decreasing the width W2 of the second sealant helps to reduce the amount of light leakage.

Based on the above simulation and analysis results, it is desired that the width W1 of the first sealant is larger than the width W2 of the second sealant. In this way, the stresses in the upper curved light-transmitting substrate 2 and the lower curved light-transmitting substrate 4 can be reduced, and the stress distributions of the upper curved light-transmitting substrate 2 and the lower curved light-transmitting substrate 4 can be improved, thereby reducing the amount of light leakage in dark state.

Figure 7:
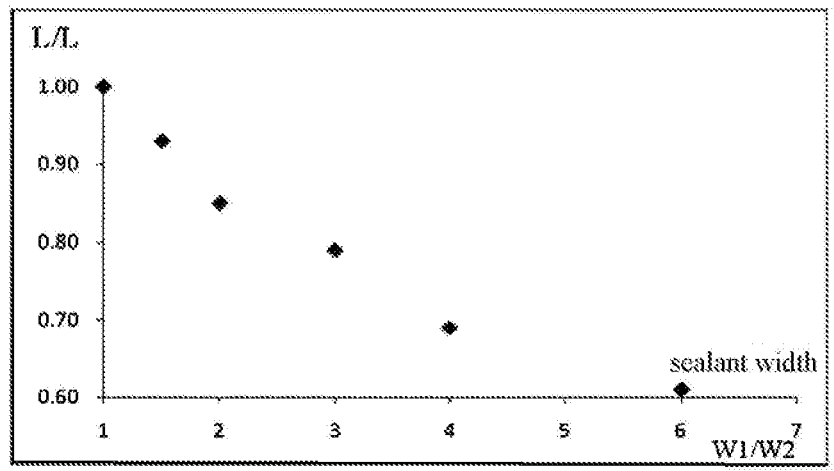
FIG. 7 illustrates a trend chart of light leakage of the curved display device varying with the variation in the ratio of the width W1 of the first sealant to the width W2 of the second sealant.

In order to further study what range where the ratio W1/W2 of the width W1 of the first sealant to the width W2 of the second sealant resides can lead to a better effect, the inventors of the application have performed further simulation experiments. FIG. 7 illustrates a trend chart of light leakage of the curved display device 10 varying with the variation in the ratio of the width W1 of the first sealant to the width W2 of the second sealant. From the simulation result shown in FIG. 7, it can be seen that, as the ratio of the width W1 of the first sealant to the width W2 of the second sealant gradually increases, the amount of light leakage of the curved display device 10 in dark state gradually decreases. For example, FIG. 7 shows that, when the abscissa W1/W2 is 1, the amount of light leakage of the ordinate L/L is about 1; when the abscissa W1/W2 is 1.5, the amount of light leakage of the ordinate L/L is about 0.92; when the abscissa W1/W2 is 2, the amount of light leakage of the ordinate L/L is about 0.84; when the abscissa W1/W2 is 3, the amount of light leakage of the ordinate L/L is about 0.80; when the abscissa W1/W2 is 4, the amount of light leakage of the ordinate L/L is about 0.69; when the abscissa W1/W2 is 6, the amount of light leakage of the ordinate L/L is about 0.62. This implies that, the larger the ratio of the width W1 of the first sealant to the width W2 of the second sealant is, the smaller the amount of light leakage in dark state is. When the abscissa W1/W2 is smaller than 1, it can be considered that the amount of light leakage of the ordinate L/L is still about 1. As regards the situation that the abscissa W1/W2 is larger than 6, as can be known from the simulation result of FIG. 7, the amount of light leakage at that time already approximates to the limit value to which W1/W2=6 corresponds. That is, it can be considered that when the abscissa W1/W2 is larger than 6, the amount of light leakage of the ordinate L/L is still about 0.62.

Figure 8:
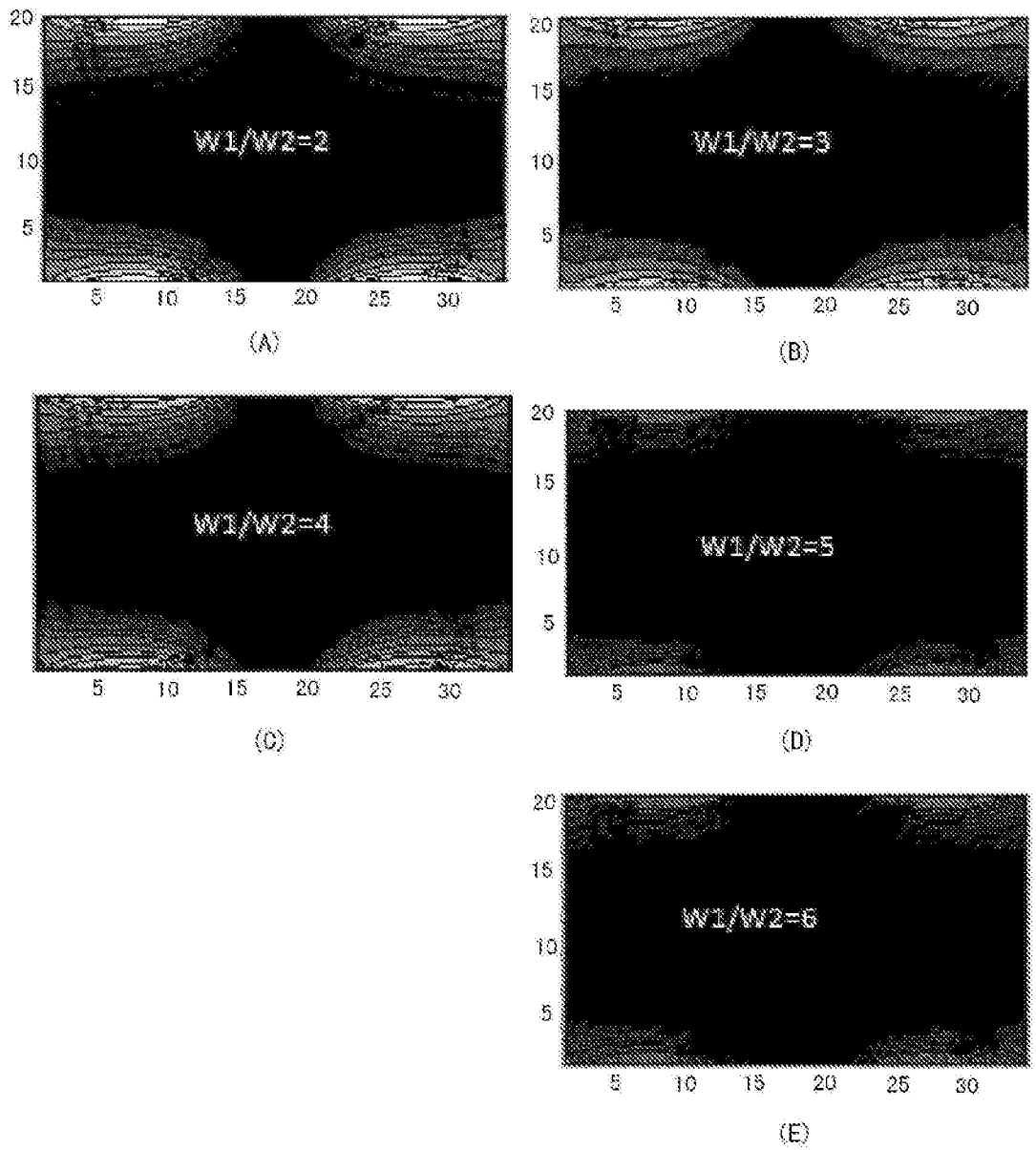
FIG. 8A illustrates a simulation view of light leakage of the curved display device in the case that the ratio of the width W1 of the first sealant to the width W2 of the second sealant, W1/W2, is 2.
FIG. 8B illustrates a simulation view of light leakage of the curved display device in the case that the ratio of the width W1 of the first sealant to the width W2 of the second sealant, W1/W2, is 3.
FIG. 8C illustrates a simulation view of light leakage of the curved display device in the case that the ratio of the width W1 of the first sealant to the width W2 of the second sealant, W1/W2, is 4.
FIG. 8D illustrates a simulation view of light leakage of the curved display device in the case that the ratio of the width W1 of the first sealant to the width W2 of the second sealant, W1/W2, is 5.
FIG. 8E illustrates a simulation view of light leakage of the curved display device in the case that the ratio of the width W1 of the first sealant to the width W2 of the second sealant, W1/W2, is 6.

FIGS. 8A-8E further illustrate simulation views of light leakage of the curved display device in the case that the ratio of the width W1 of the first sealant to the width W2 of the second sealant is 2, 3, 4, 5, 6, respectively. From the simulation results shown in FIGS. 8A-8E, it can be seen that, there is a maximum light leakage in dark state when the ratio of the width W1 of the first sealant to the width W2 of the second sealant is 2. FIG. 8A contains more white areas, i.e. more light leakage areas in dark state, and fewer black areas, i.e. fewer areas where transmission of light is blocked in dark state. As the ratio of the width W1 of the first sealant to the width W2 of the second sealant increases, for example, varying from 2 to 3 as shown in FIGS. 8A, 8B, varying from 3 to 4 as shown in FIG. 8C, varying from 4 to 5 as shown in FIG. 8D, and varying from 5 to 6 as shown in FIG. 8E, it can be seen that the white areas in FIGS. 8A-8E become fewer and fewer, i.e. the light leakage areas in dark state become fewer and fewer, and the black areas therein become more and more, i.e. the areas where transmission of light is blocked in dark state become more and more. This implies that as the ratio of the width W1 of the first sealant to the width W2 of the second sealant varies from 2 to 3, from 3 to 4, from 4 to 5, from 5 to 6, the amount of light leakage in dark state gradually decreases, and it is minimum when the ratio of the width W1 of the first sealant to the width W2 of the second sealant is 6. Accordingly, in some embodiments, the ratio of the width W1 of the first sealant to the width W2 of the second sealant may be 1<W1/W2≤6.

In view of the above description, it can be learned that the distribution of sealants in the embodiments of the invention may include at least two meanings. The first meaning is to reduce the width W1 of the first sealant and the width W2 of the second sealant as much as possible while keeping the width W1 of the first sealant equal to the width W2 of the second sealant. The sealants of such width distribution can effectively reduce the stresses in the upper curved light-transmitting substrate 2 and the lower curved light-transmitting substrate 4, while changing the stress distributions of the upper curved light-transmitting substrate 2 and the lower curved light-transmitting substrate 4. In this way, the amount of light leakage in dark state can be effectively reduced. The second meaning is to select a suitable ratio of the width W1 of the first sealant to the width W2 of the second sealant in the case that the width W1 of the first sealant is larger than the width W2 of the second sealant. The sealants of such width distribution can also effectively reduce the stresses in the upper curved light-transmitting substrate 2 and the lower curved light-transmitting substrate 4, while changing the stress distributions of the upper curved light-transmitting substrate 2 and the lower curved light-transmitting substrate 4. In this way, the amount of light leakage in dark state can also be effectively reduced.

For the first meaning mentioned above, i.e. reducing the width W1 of the first sealant and the width W2 of the second sealant as much as possible while keeping the width W1 of the first sealant equal to the width W2 of the second sealant, as compared to the conventional curved display device in which the width of the first sealant and the width of the second sealant are both relatively large, the traction of the sealants on the upper curved light-transmitting substrate 2 and the lower curved light-transmitting substrate 4 can be reduced, that is, the traction on edges of the non-curved sides and the traction on edges of the curved sides are simultaneously reduced, such that the upper curved light-transmitting substrate 2 and the lower curved light-transmitting substrate 4 are more inclined to recover to the states before being curved. In this way, the optical axes in the corner areas of the upper curved light-transmitting substrate 2 and the lower curved light-transmitting substrate 4 are closer to 0° or 180°. In this case, the internal stresses of the upper curved light-transmitting substrate 2 and the lower curved light-transmitting substrate 4 can be effectively reduced, while the stress distribution of the upper curved light-transmitting substrate 2 and the lower curved light-transmitting substrate 4 are changed, thereby reducing the amount of light leakage in dark state.

For the second meaning mentioned above, i.e. selecting a suitable ratio of the width W1 of the first sealant to the width W2 of the second sealant in the case that the width W1 of the first sealant is larger than the width W2 of the second sealant, as compared to the conventional curved display device, increasing the width W1 of the first sealant and reducing the width W2 of the second sealant may enable the upper curved light-transmitting substrate 2 and the lower curved light-transmitting substrate 4 to have a larger traction in the horizontal direction (which is generally considered to be perpendicular to the edges of the non-curved sides), and to have a smaller traction in the vertical direction (which is generally considered to be perpendicular to the edges of the curved sides). Since the traction in the horizontal direction is larger than that in the vertical direction, the angles of the stress distributions of the upper curved light-transmitting substrate 2 and the lower curved light-transmitting substrate 4, especially the angles of the stress distributions of the corner areas of the upper curved light-transmitting substrate 2 and the lower curved light-transmitting substrate 4 tend to incline to the horizontal direction, i.e. getting close to 0° or 180°. Relative to the conventional curved display device mentioned in the background in which the optical axes of the upper-left corner areas and the upper-right corner areas are close to 30° or −30°, even close to 45° or −45°, the angles of the stress distributions of the corner areas in the embodiments of the invention are taken slightly closer to the horizontal direction, which would enable the optical axes of the corner areas to be at a level smaller than 30° or −30°, that is, the angles of the stress distributions or the optical axes are more inclined to get close to 0° or 180°. In this case, the stresses in the upper curved light-transmitting substrate 2 and the lower curved light-transmitting substrate 4 can be effectively reduced, while the stress distribution of the upper curved light-transmitting substrate 2 and the lower curved light-transmitting substrate 4 are changed, and the amount of light leakage in dark state is effectively reduced.

In an embodiment of the invention, in the case of manufacturing a curved display device of liquid crystal type, a space enclosed by the upper curved light-transmitting substrate 2, the lower curved light-transmitting substrate 4 and the sealant (e.g. the non-curved side 6 of the sealant and the curved side 8 of the sealant) may comprise a liquid crystal layer (not shown in the drawings). Although the liquid crystal layer is not specifically shown in the drawings of the application, it is not difficult for those skilled in the art to implement it on the basis of the introduction of the embodiment of the invention in combination with the arrangement of a liquid crystal layer in the conventional curved display device of liquid crystal type.

In some embodiments, the upper curved light-transmitting substrate 2 is a color filter light-transmitting substrate or transparent conductive film light-transmitting substrate, and the lower curved light-transmitting substrate 4 is a thin film transistor light-transmitting substrate.

In some embodiments, the curved display device 10 may further comprise a first polarizer located on a surface of the upper curved light-transmitting substrate 2 away from the lower curved light-transmitting substrate 4, a second polarizer located on a surface of the lower curved light-transmitting substrate 4 away from the upper curved light-transmitting substrate 2, a polarization direction of the first polarizer is orthogonal to that of the second polarizer. Although the first polarizer and the second polarizer are not specifically illustrated in the drawings of the application, it is not difficult for those skilled in the art to implement them on the basis of the introduction of the embodiments of the invention in combination with the arrangement of a first polarizer and a second polarizer in the conventional curved display device. In the operation of the curved display device 10, since the polarization directions of the first polarizer and the second polarizer are orthogonal, it ensures that the light that has passed through the first polarizer, the upper curved light-transmitting substrate 2 or has further passed through the liquid crystal layer in dark state cannot pass through the second polarizer and is consequently blocked when it reaches the second polarizer after passing through the upper curved light-transmitting substrate 2. This helps to achieve a small amount of light leakage in dark state.

Figure 9:
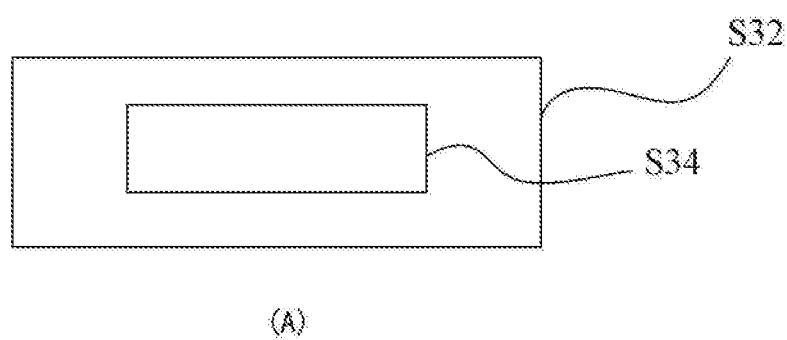
FIG. 9A illustrates a partial flow chart of a method for manufacturing the curved display device according to an embodiment of the invention.
FIG. 9B illustrates a partial flow chart of a method for manufacturing the curved display device according to another embodiment of the invention.
Figure 9:
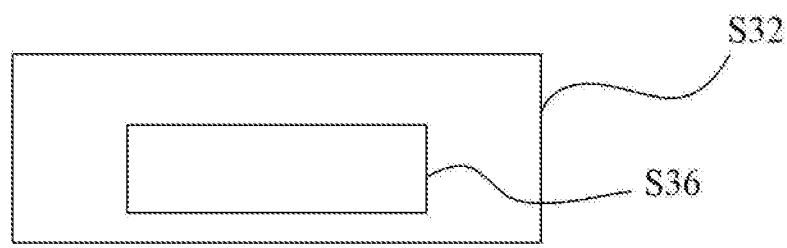

Another embodiment of the invention provides a method for manufacturing a curved display device. FIG. 9A illustrates steps of the method for manufacturing a curved display device, which may comprise step S32 of forming, between an upper curved light-transmitting substrate 2 and a lower curved light-transmitting substrate 4 arranged opposite to the upper curved light-transmitting substrate 2, a sealant along edges of the upper curved light-transmitting substrate 2 and the lower curved light-transmitting substrate 4. The sealant comprises a first sealant located at edges of non-curved sides of the upper curved light-transmitting substrate 2 and the lower curved light-transmitting substrate 4, and a second sealant located at edges of curved sides of the upper curved light-transmitting surface 2 and the lower curved light-transmitting surface 4. The first sealant and the second sealant enable the upper curved light-transmitting substrate 2 to adhere to the lower curved light-transmitting substrate 4, and reduce the stresses in the upper curved light-transmitting substrate 2 and the lower curved light-transmitting substrate 4, while changing the stress distributions of the upper curved light-transmitting substrate 2 and the lower curved light-transmitting substrate 4.

In some embodiments, the width W1 of the first sealant is larger than the width W2 of the second sealant.

In some embodiments, the step of forming the sealant may be achieved by means of coating, the method may comprise a step S34 of increasing the pressure on a sealant applicator nozzle at the time of coating edges of non-curved sides of the upper curved light-transmitting substrate 2 and the lower curved light-transmitting substrate 4, and decreasing the pressure on the sealant applicator nozzle at the time of coating edges of curved sides of the upper curved light-transmitting substrate 2 and the lower curved light-transmitting substrate 4. Increasing the pressure on the sealant applicator nozzle enables the sealant nozzle to inject more sealant in unit time. Decreasing the pressure on the sealant applicator nozzle enables the sealant nozzle to inject less sealant in unit time. Since the amounts of sealant injected by the sealant applicator nozzle in unit time are different, there is more sealant at the time of coating edges of the non-curved sides of the upper curved light-transmitting substrate 2 and the lower curved light-transmitting substrate 4, and there is less sealant at the time of coating edges of curved sides of the upper curved light-transmitting substrate 2 and the lower curved light-transmitting substrate 4. In the case that the edges of the non-curved sides and the edges of the curved sides of the upper curved light-transmitting substrate 2 and the lower curved light-transmitting substrate 4 bear the same pressure upon press, more sealant means that the sealant at the edges of the non-curved sides of the upper curved light-transmitting substrate 2 and the lower curved light-transmitting substrate 4 is relatively wide, and less sealant means that the sealant at the edges of the curved sides of the upper curved light-transmitting substrate 2 and the lower curved light-transmitting substrate 4 is relatively narrow.

Alternatively, the step S32 of forming a sealant, may further comprise step S36, performing injection more times by the sealant applicator nozzle at positions parallel to the edges of non-curved sides of the upper curved light-transmitting substrate 2 and the lower curved light-transmitting substrate 4 than at positions parallel to the edges of curved sides of the upper curved light-transmitting substrate 2 and the lower curved light-transmitting substrate 4. When the pressures on the sealant applicator nozzle are consistent, more sealant can be injected by performing multiple injections by the sealant applicator nozzle at the positions parallel to the edges of the non-curved sides of the upper curved light-transmitting substrate 2 and the lower curved light-transmitting substrate 4, such that the width of the sealant at the edges of the non-curved sides of the upper curved light-transmitting substrate 2 and the lower curved light-transmitting substrate 4 is relatively large. Less sealant can be injected by performing a few injections by the sealant applicator nozzle at the positions parallel to the edges of the curved sides of the upper curved light-transmitting substrate 2 and the lower curved light-transmitting substrate 4 such that the width of the sealant at the edges of the curved sides of the upper curved light-transmitting substrate 2 and the lower curved light-transmitting substrate 4 is relatively small.

In some embodiments, the ratio of the width W1 of the first sealant to the width W2 of the second sealant may be 1<W1/W2≤6.

In the case of manufacturing a curved display device of liquid crystal type, the method comprises arranging a liquid crystal layer between the upper curved light-transmitting substrate 2 and the lower curved light-transmitting substrate 4 prior to forming a sealant along the edges of the upper curved light-transmitting substrate 2 and the lower curved light-transmitting substrate 4.

In some embodiments, the upper curved light-transmitting substrate 2 is a color filter light-transmitting substrate or transparent conductive film light-transmitting substrate, and the lower curved light-transmitting substrate 4 is a thin film transistor light-transmitting substrate.

Another embodiment of the invention provides an electronic device, which may comprise the curved display device as described in any of the above embodiments or the curved display device manufactured using the above method for manufacturing a curved display device.

Although examples of the invention are described with reference to the embodiments currently taken into account, it should be understood that the invention is not limited to the disclosed embodiments. On the contrary, the present invention intends to cover various amendments and equivalent arrangements within the spirit and scope of the appended claims. The scope of the claims satisfies the widest explanation so as to encompass each of such amendments as well as equivalent structures and functions thereof.

The invention claimed is:

1. A curved display device comprising:
   a first curved light-transmitting substrate;
   a second curved light-transmitting substrate arranged opposite to the first curved light-transmitting substrate, wherein each of the first curved light-transmitting substrate and the second curved light-transmitting substrate comprises a first non-curved side and a second non-curved side opposite to each other and a first curved side and a second curved side opposite to each other;
   a sealant located between the first curved light-transmitting substrate and the second curved light-transmitting substrate and arranged along edges of the first curved light-transmitting substrate and the second curved light-transmitting substrate, the sealant comprising a first sealant located at an edge of the first non-curved side of the first curved light-transmitting substrate and an edge of the first non-curved side of the second curved light-transmitting substrate, and a second sealant located at an edge of the first curved side of the first curved light-transmitting substrate and an edge of the first curved side of the second curved light-transmitting substrate, the first sealant and the second sealant enabling the first curved light-transmitting substrate to adhere to the second curved light-transmitting substrate, wherein a width W1 of the first sealant is larger than a width W2 of the second sealant, and a direction of the width W1 of the first sealant is perpendicular to an extension direction of the first non-curved side of the first curved light-transmitting substrate or the second curved light-transmitting substrate, a direction of the width W2 of the second sealant is perpendicular to an extension direction of the first curved side of the first curved light-transmitting substrate or the second curved light-transmitting substrate.

2. The curved display device according to claim 1, wherein the first sealant and the second sealant are made of the same material.

3. The curved display device according to claim 1, wherein a ratio of the width W1 of the first sealant to the width W2 of the second sealant is 1<W1/W2≤6.

4. The curved display device according to claim 1, wherein a space enclosed by the first curved light-transmitting substrate, the second curved light-transmitting substrate and the sealant comprises a liquid crystal layer.

5. The curved display device according to claim 1, wherein the first curved light-transmitting substrate is a color filter light-transmitting substrate or transparent conductive film light-transmitting substrate, the second curved light-transmitting substrate is a thin film transistor light-transmitting substrate.

6. The curved display device according to claim 1, wherein the curved display device further comprises:
   a first polarizer located on a surface of the first curved light-transmitting substrate away from the second curved light-transmitting substrate, a second polarizer located on a surface of the second curved light-transmitting substrate away from the first curved light-transmitting substrate, wherein a polarization direction of the first polarizer is orthogonal to that of the second polarizer.

7. A method for manufacturing a curved display device, comprising a step of forming, between a first curved light-transmitting substrate and a second curved light-transmitting substrate arranged opposite to the first curved light-transmitting substrate, a sealant along edges of the first curved light-transmitting substrate and the second curved light-transmitting substrate, wherein each of the first curved light-transmitting substrate and the second curved light-transmitting substrate comprises a first non-curved side and a second non-curved side opposite to each other and a first curved side and a second curved side opposite to each other, wherein the sealant comprises a first sealant located at an edge of the first non-curved side of the first curved light-transmitting substrate and an edge of the first non-curved side of the second curved light-transmitting substrate, and a second sealant located at an edge of the first curved side of the first curved light-transmitting substrate and an edge of the first curved side of the second curved light-transmitting substrate, the sealant enabling the first curved light-transmitting substrate to adhere to the second curved light-transmitting substrate, wherein a width W1 of the first sealant is larger than a width W2 of the second sealant, and a direction of the width W1 of the first sealant is perpendicular to an extension direction of the first non-curved side of the first curved light-transmitting substrate or the second curved light-transmitting substrate, a direction of the width W2 of the second sealant is perpendicular to an extension direction of the first curved side of the first curved light-transmitting substrate or the second curved light-transmitting substrate.

8. The method for manufacturing a curved display device according to claim 7, wherein the step of forming the sealant is achieved by means of coating,
   the method comprises: increasing a pressure on a sealant applicator nozzle at the time of coating edges of non-curved sides of the first curved light-transmitting substrate and the second curved light-transmitting substrate, decreasing the pressure on the sealant applicator nozzle at the time of coating edges of curved sides of the first curved light-transmitting substrate and the second curved light-transmitting substrate.

9. The method for manufacturing a curved display device according to claim 7, wherein the method comprises: performing injection more times by a sealant applicator nozzle at positions parallel to the edges of non-curved sides of the first curved light-transmitting substrate and the second curved light-transmitting substrate than at positions parallel to the edges of curved sides of the first curved light-transmitting substrate and the second curved light-transmitting substrate.

10. The method for manufacturing a curved display device according to claim 7, wherein a ratio of the width W1 of the first sealant to the width W2 of the second sealant is 1<W1/W2≤6.

11. The method for manufacturing a curved display device according to claim 7, wherein the method comprises arranging a liquid crystal layer between the first curved light-transmitting substrate and the second curved light-transmitting substrate prior to forming a sealant along edges of the first curved light-transmitting substrate and the second curved light-transmitting substrate.

12. The method for manufacturing a curved display device according to claim 7, wherein the first curved light-transmitting substrate is a color filter light-transmitting substrate or transparent conductive film light-transmitting substrate, the second curved light-transmitting substrate is a thin film transistor light-transmitting substrate.

13. An electronic device comprising a curved display device, the curved display device comprising:
   a first curved light-transmitting substrate;
   a second curved light-transmitting substrate arranged opposite to the first curved light-transmitting substrate, wherein each of the first curved light-transmitting substrate and the second curved light-transmitting substrate comprises a first non-curved side and a second non-curved side opposite to each other and a first curved side and a second curved side opposite to each other;
   a sealant located between the first curved light-transmitting substrate and the second curved light-transmitting substrate and arranged along edges of the first curved light-transmitting substrate and the second curved light-transmitting substrate, the sealant comprising a first sealant located at an edge of the first non-curved side of the first curved light-transmitting substrate and an edge of the first non-curved side of the second curved light-transmitting substrate, and a second sealant located at an edge of the first curved side of the first curved light-transmitting substrate and an edge of the first curved side of the second curved light-transmitting substrate, the first sealant and the second sealant enabling the first curved light-transmitting substrate to adhere to the second curved light-transmitting substrate, wherein a width W1 of the first sealant is larger than a width W2 of the second sealant, and a direction of the width W1 of the first sealant is perpendicular to an extension direction of the first non-curved side of the first curved light-transmitting substrate or the second curved light-transmitting substrate, a direction of the width W2 of the second sealant is perpendicular to an extension direction of the first curved side of the first curved light-transmitting substrate or the second curved light-transmitting substrate.

14. The electronic device according to claim 13, wherein the first sealant and the second sealant have the same material.

15. The electronic device according to claim 14, wherein a ratio of the width W1 of the first sealant to the width W2 of the second sealant is 1<W1/W2≤6.

16. The electronic device according to claim 13, wherein a space enclosed by the first curved light-transmitting substrate, the second curved light-transmitting substrate and the sealant comprises a liquid crystal layer.

17. The electronic device according to claim 13, wherein the first curved light-transmitting substrate is a color filter light-transmitting substrate or transparent conductive film light-transmitting substrate, the second curved light-transmitting substrate is a thin film transistor light-transmitting substrate.

* * * * *